Nov. 10, 1970 — R. W. CROWE — 3,539,421
METHOD AND APPARATUS FOR UNITING PLASTIC BODIES
Filed June 21, 1966 — 2 Sheets-Sheet 1

INVENTOR:
ROBERT W. CROWE
BY
Dawson, Tilton, Fallon, Lungmus & Alexander
ATT'YS

Nov. 10, 1970  R. W. CROWE  3,539,421
METHOD AND APPARATUS FOR UNITING PLASTIC BODIES
Filed June 21, 1966  2 Sheets-Sheet 2

INVENTOR:
ROBERT W. CROWE
BY
Dawson, Tilton, Falloy, Lungmus & Alexander
ATT'YS

United States Patent Office 3,539,421
Patented Nov. 10, 1970

3,539,421
METHOD AND APPARATUS FOR UNITING PLASTIC BODIES
Robert W. Crowe, San Gabriel, Calif., assignor to Dentin Manufacturing Company, Bellwood, Ill., a corporation of Illinois
Filed June 21, 1966, Ser. No. 559,136
Int. Cl. B30b *15/06, 15/34*
U.S. Cl. 156—583   2 Claims

ABSTRACT OF THE DISCLOSURE

An apparatus and method for forming an integral hollow panel structure. A top shell of glass fibers and resin is separately molded and cured. A bottom shell is similarly molded, and a resin-impregnated honeycomb paper core is pressed against the bottom shell and cured to anchor the core to the shell. A thermoplastic resin is applied to the interior of the top shell, and the top and bottom shells are then brought together. The top shell is supported upon a surface having the desired final surface contour, and a uniform pressure is applied over the bottom shell to move the core edges into wiping contact with the resin of the top shell. The pressure is maintained while the resin is cured.

Figure 1:
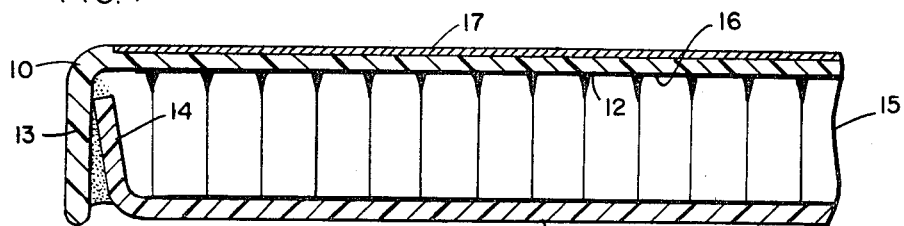

This invention relates to method and apparatus for uniting plastic bodies. The invention is particularly useful in uniting shells formed of glass fibers and polyester resins with a phenolic resin and paper core anchored to the two shells.

In uniting plastic bodies, such as shells formed of glass fibers and thermosetting resin and with a reinforced paper core between the shells, a problem is presented in that the webs of the shells are flexible and it is extremely difficult to unite all the edges of the core to the shells. When some of the core edges are not attached to the shells, an unevenness occurs in the finished product. Further, by way of example, when a hollow shell is formed for use in table tennis, if there are unattached portions of the shell in an area, it is found that this area loses its activity and the ball does not bounce on the area as on other areas where the core is firmly attached. The difficulty of forming a table or other hollow panel structure is accentuated because of the shrinking of the resin during the curing of the structure.

I have discovered that by curing separately the two shells to be united, while also anchoring the core to the bottom shell, applying resin to the interior of the top shell, bringing the shells together with their rims in facing telescoping relation, inverting the assembled parts to bring the top shell against a flat surface or a surface having the desired final contour therefor, and the aplying of flexing pressure uniformly against the entire web of the bottom panel, the core edges will wipe against the resin of the top shell to form a bond contact, and on curing an effective complete union is brought about. The sliding contact of the many cell edges against the resin of the top shell gives a solid bond even though a thin layer of resin is used.

The resulting table or hollow panel has a true top surface which is held permanently in this condition, while the web of the bottom panel which has been pressed into a slightly irregular conformation is hidden from view and the slight undulations or irregularities, by reason of the extensive bonding effect of the core, actually strengthen the structure.

A primary object, therefore, of the invention is to provide a method and means for forming a hollow panel structure which is reinforced with a core to provide an integral structure having a true top surface of the desired contour. A further object is to provide a method and means for uniting two shells or panels by means of a core through exerting uniform flexing pressure against the bottom shell so as to bring all of the edges of the core structure into wiping contact with a resin-coated surface of the top shell and curing the structure while the web of the top shell is held in contact with the core. A further object is to provide apparatus which is effective in providing a flexible and uniform pressure against the flexible web of the bottom shell to maintain all of the free edges of the core in wiping contact with the resin coating over the interior of the top shell. Other specific objects and advantages will appear as the specification proceeds.

Figure 2:
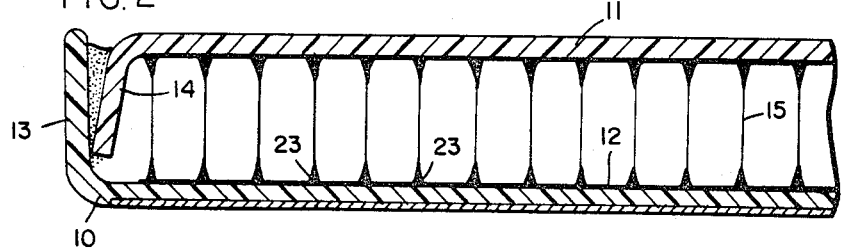
Figure 3:
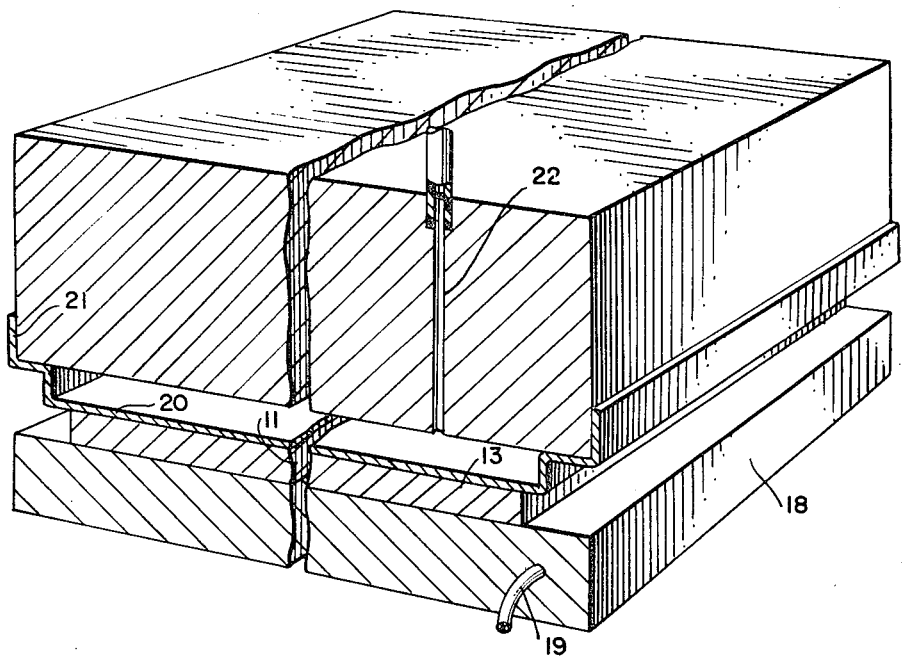
Figure 4:
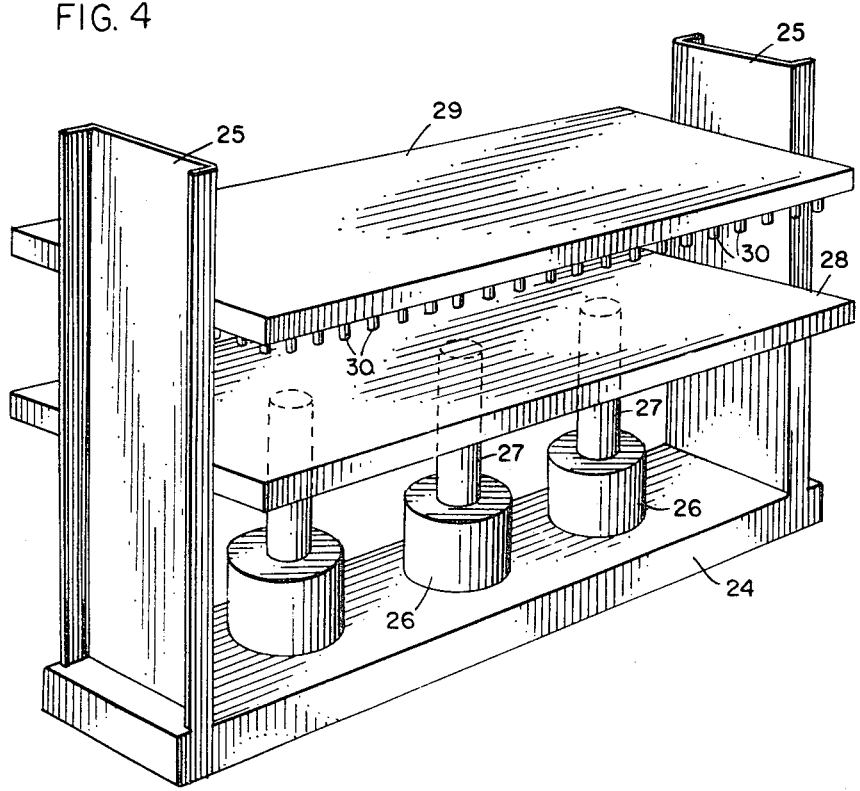

The invention is shown, in illustrative embodiments, by the accompanying drawings, in which:

FIG. 1 is a broken perspective view of shell structures united by a core and with the rims of the two shells bonded together with resin; FIG. 2, a broken perspective view of the shell bodies in inverted position for application of pressure against the web of the bottom panel during the process of uniting the core to the top panel; FIG. 3, a broken perspective view of apparatus which may be employed in exerting pressure against the web of the bottom shell to urge the core throughout into contact with the resin of the inverted top shell; FIG. 4, a perspective view of a modified form of apparatus in which coil springs are employed as flexible pressure-applying means engageable with the web of the bottom shell; and FIG. 5, a perspective view of another modified form of apparatus in which the spring coils are arranged in a circular formation.

In one embodiment of my invention, I separately form a top panel or shell 10 and a bottom panel or shell 11. For example, in a pan mold, liquid polyester resin combined with glass fibers and preferably containing a catalyst, such as methyl ethyl ketone, is sprayed to form a web body 12 with an inwardly or downwardly turned rim 13, as shown in FIG. 1. Preferably, about one part of fibers is combined with three parts of resin by weight. The resulting panel may be subjected to low pressure, such as, for example, 5 to 6 pounds, and the panel cured at tempeartures of about 70–125° F. to form a rigid pan-like panel, as shown best in FIGS. 1 and 2.

The bottom shell 11 is separately formed in a similar manner to provide a web body which is flexible and an inwardly or upwardly turned rim 14, as shown best in FIG. 1. Into the shell 11, a honeycomb core 15 formed of coiled paper impregnated with phenolic resin is introduced, and while the core is still wet with the resin, the core is pressed against the shell 11 to form a good contact. The bottom shell 11 and the honeycomb core are then cured at a suitable temperature, as, for example, 120° F., to form a rigid panel in which the phenolic paper core is anchored to and integrated with shell 11.

After the two shells 10 and 11 have been separately formed as above described, I next apply to the interior of the top shell 10 a thermoplastic resin coating 16, such as polyester resin or any other suitable thermoplastic resin. I prefer to employ as thin a coating as possible, and by the inner action hereinafter described, it is found possible to employ a thin and light coating while still bringing about effective integrating of the structure.

The top shell 10 may be formed solely of glass fibers and resin, thus making it suitable for table tennis and a variety of other structures, or, if desired, the top shell may be provided with a surface layer 17 of melamine or other suitable material, making it useful for desk or table tops, etc.

The panels 10 and 11 are brought together with the rims 13 and 14 in facing telescoping relation and the assembled structure is then inverted to the position shown in FIG. 2. The web of the shell 10 is supported upon a flat surface or a surface having the desired contour for the finished top shell, and with the parts in this arrangement I exert a flexing uniform pressure over the entire area of the web of panel 11 so as to cause a simultaneous wiping contact between all of the edges of the core 15 with the resin 12 of the shell 10.

The flexing uniform pressure may be applied by any suitable means. In the illustration given in FIG. 3, I provide a hollow platform 18 upon which the assembled structure shown in FIG. 2 is placed. The hollow platform 18 may be provided with any heating fluid introduced through conduit 19 and withdrawn from an outlet conduit (not shown). Above the assembled structure shown in FIG. 2 is a flexing diaphragm or bladder 20 having its edges sealed to a supporting block or box 21. The support 21 may be hollow or solid, since its only function is to support the flexible diaphragm 20. A conduit 22 is provided for supplying a fluid under pressure to move the diaphragm 20 against the top surface of the bottom shell 11.

The flexible diaphragm may be formed of vinyl plastic, rubber, or any suitable material, and the pressure may be supplied by hydraulic fluids, including oil, water, etc., or gaseous fluids, such as air, etc.

In operation, the operator after assembling the parts, as shown in FIG. 2, presses the assembled body under the diaphragm 20 and then introduces pressure fluid which causes the diaphragm 20 to flex the web of the bottom shell 11 downwardly to bring all of the free edges of the core into sliding or wiping contact with the inner surface of shell 10, and in this operation all of the cells of the core 15 have their edges move against the resin 12 to wipe against it and form clumps or accumulations 23, shown best in FIG. 2. At the same time, the simultaneous application of pressure all over the top surface of shell 10 brings about a slight irregularity in the shell 11 while causing the core edges to slide against the top panel 10 into a contacting relation which later, after the curing operation, is the desired position for supporting the outer surface of the top shell 10 in its true desired contour. There is thus insured a bonding of each individual cell edge against the top shell 10 and in a desired relation for supporting throughout the top surface of shell 10 in a true, final contour or shape.

In the modification shown in FIG. 4, I provide a base 24 with vertical support standards 25. Hydraulic cylinders 26 are supported upon the base and carry plunges 27 which move a platform 28 in a vertical position. A fixed platform 29 is supported upon the standards 25 and are equipped with closely-spaced depending coil springs 30.

In the operation of the structure shown in FIG. 4, the operator places upon the platform 28 the assembly shown in FIG. 2, and as the assembly is pressed upwardly, the closely-spaced spring coils 30 exert wide uniform pressure against the web of the bottom shell 11 to bring about simultaneous wiping action between the edges of the core 15 with the resin 12 of the top shell 10. It will be understood that hydraulic, pneumatic or other pressure means may be employed for raising the shell assembly.

Figure 5:
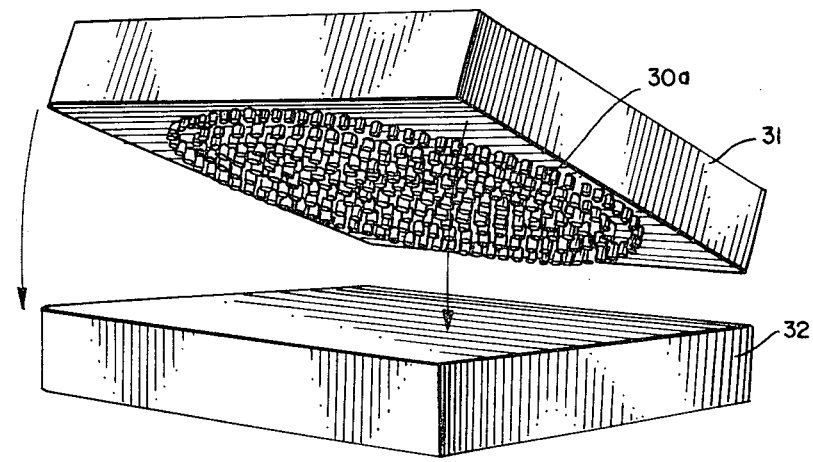

In the modification shown in FIG. 5, the closely-spaced spring coils 30a are arranged in a concentric manner on the jaw member 31. Hinge mechanism, not shown, may be employed for swinging the member 31 in an arc downwardly toward the platform 32 on which the shell assembly may be placed.

The concentric arrangement of the spring coils 30a is useful in that the mechanism may be employed for uniting circular panels or shells for forming round tables or other circular hollow structures of different diameters.

The coil springs may be arranged in any desired arrangement. I find that employing a spring every 4", the springs being about 2" long and compressing about ½" in operation, gives very satisfactory results. Over a 4" area, the pressure is about 2½ pounds per square inch. Pressures from 1 to 10 pounds per square inch have been found satisfactory, but a wider range may be employed depending upon the thickness and character of the panels being united.

After the shell assembly as shown in FIG. 2 is subjected to pressure, the curing is effected while the parts remain in situ. The bottom platen or platform may be heated by hot air, steam, or any suitable medium. If desired, hot air can be passed over the top and bottom of the assembly. Curing temperatures may range from 125° up to 200° F. At a temperature of 140° F. maintained in the bottom platen, curing can be effected in as little as 2½ minutes. It will be understood that a wide range of temperatures may be employed depending upon the results desired and the time in which the curing is to be completed.

Specific examples illustrating the invention may be set out as follows:

EXAMPLE I

A top panel such as is indicated by numeral 10 in FIG. 1 and a bottom panel as indicated by numeral 11 were separately formed by spraying a mixture of polyester resin and fibers together with a small amount of methylethyl ketone within a mold pan. The top panel was cured under a pressure of about 6 pounds in an oven until the material solidified in the shape shown in FIG. 1. A honeycomb core formed of coiled paper impregnated with phenolic resin was introduced into the bottom of the shell while still wet with the resin and pressed against the shell to form a good contact. The bottom shell and the honeycomb core were then cured at about 120° F. to form a rigid panel integrated and bonded with the phenolic core. The bottom shell and the top shell were then placed so that their rims were facing and in telescoping arrangement, and the structure inverted to bring the top shell upon the surface of the platform 18, as shown in FIG. 3. Additional fibers and resin were placed between the rim portions of the two shells. Compressed air was then introduced into the chamber above the diaphragm 20 and the diaphragm was then pressed firmly against the web of the shell 11. Under this pressure, the web of shell 11 conformed to the irregularities of the core and top shell so as to form a sturdy bond, while at the same time the pressure gave the top shell a surface conforming exactly to the top surface of platform 18. The combined structure was then cured in situ to form the finished integrated panel. In the foregoing example, the resin employed was Pittsburgh #5180 polyester resin, and the fibers were Owen-Corning glass fibers. In the curing of the resin, the temperature in the platen 18 was 125° F.

EXAMPLE II

The process was caried out as described in Example I except that the glass fibers were employed in a polyester Plaskon resin #430.

EXAMPLE III

The process may be carried out as described in Example I except that epoxy resin is used instead of a polyester resin.

While in the foregoing specification, the process steps and the apparatus employed have been described in considerable detail for the purpose of illustrating embodiments of the invention, it will be understood that such details may be varied widely by those skilled in the art without departing from the spirit of my invention.

I claim:

1. In apparatus for uniting a top shell and a bottom shell each having a flexible web terminating in inwardly-turned telescoping rims, one shell having anchored therein a core body and the other shell having its interior coated with a resin, a frame, a first platen member supported in said frame having a free surface adapted to engage the top surface of said top shell under pressure to provide the desired contour thereof, a second platen member supported in said frame and equipped with closely-spaced compressible coil springs having unsupported free ends extending toward said first platen, each coil spring being secured to the second platen independently of the others and being compressible independently of the others both axially and laterally, said platens being spaced apart to receive therebetween said shells and core body with the top surface of the top shell bearing against said first platen surface and with the free ends of said springs extending toward the bottom of said bottom shell, and means for pressing one of said platens toward the other to bring said springs into direct pressing engagement with the bottom of said bottom shell to obtain substantially complete contact between each of the top and bottom shells and the core.

2. The structure of claim 1 in which said coil springs are concentrically arranged.

References Cited

UNITED STATES PATENTS

| | | | |
|---|---|---|---|
| 2,575,734 | 11/1951 | Schulman. | |
| 2,646,105 | 7/1953 | Langer. | |
| 2,671,493 | 3/1954 | Olson | 100—211 XR |
| 2,782,465 | 2/1957 | Palmer | 161—43 XR |
| 2,911,274 | 11/1959 | Grube | 52—619 |
| 3,021,916 | 2/1962 | Kemp | 52—615 XR |
| 3,067,309 | 12/1962 | Chinn | 156—583 |
| 3,141,206 | 7/1964 | Stephens | 161—149 XR |
| 3,450,593 | 6/1969 | Fossier et al. | 161—43 |

FOREIGN PATENTS 739,334   10/1932   France.

JOHN T. GOOLKASIAN, Primary Examiner

R. A. KILLWORTH, Assistant Examiner

U.S. Cl. X.R.

100—211, 265; 156—580